United States Patent
Yang et al.

(10) Patent No.: US 12,388,976 B2
(45) Date of Patent: Aug. 12, 2025

(54) DEVICE AND METHOD FOR CODING VIDEO DATA

(71) Applicant: SHARP KABUSHIKI KAISHA, Sakai (JP)

(72) Inventors: Yu-Chiao Yang, Taipei (TW); Chih-Yu Teng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 187 days.

(21) Appl. No.: 17/847,929

(22) Filed: Jun. 23, 2022

(65) Prior Publication Data

US 2022/0417501 A1 Dec. 29, 2022

Related U.S. Application Data

(60) Provisional application No. 63/216,191, filed on Jun. 29, 2021.

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
CPC .. H04N 19/105; H04N 19/159; H04N 19/176; H04N 19/146; H04N 19/593; H04N 19/80; H04N 19/11; H04N 19/103; H04N 19/107
See application file for complete search history.

(56) References Cited

U.S. PATENT DOCUMENTS

| | | | |
|---|---|---|---|
| 12,267,512 B2 * | 4/2025 | Li | H04N 19/96 |
| 2003/0108099 A1 * | 6/2003 | Nagumo | G06T 9/20 |
| | | | 375/E7.199 |
| 2017/0339404 A1 | 11/2017 | Panusopone et al. | |

(Continued)

FOREIGN PATENT DOCUMENTS

WO   WO-2022256825 A1 * 12/2022 ........... H04N 19/105

OTHER PUBLICATIONS

Abdoli (Ateme) M et al: "Non-CE3: Decoder-side Intra Mode Derivation with Prediction Fusion", 14. JVET Meeting; Mar. 19, 2019-Mar. 27, 2019; Geneva; (The Joint Video Exploration Team of ISO/IEC JTC1/SC29/WG11 and ITU-T SG.16 ), No. JVET-N0342 Mar. 18, 2019 (Mar. 18, 2019), pp. 1-4.

(Continued)

*Primary Examiner* — Joseph Suh
(74) *Attorney, Agent, or Firm* — ScienBiziP, P.C.

(57) ABSTRACT

A method of decoding a bitstream by an electronic device is provided. The electronic device receives the bitstream. In addition, the electronic device determines a block unit from an image frame according to the bitstream and selects a plurality of intra candidate modes from a plurality of intra default modes for the block unit. The electronic device further generates a template prediction for each of the plurality of intra candidate modes, selects a plurality of prediction modes from the plurality of intra candidate modes based on the template predictions, and reconstructs the block unit based on the plurality of prediction modes.

20 Claims, 6 Drawing Sheets

(56) References Cited

U.S. PATENT DOCUMENTS

2018/0332284 A1* 11/2018 Liu ................. H04N 19/96
2022/0417511 A1* 12/2022 Li .................. H04N 19/46

OTHER PUBLICATIONS

Wang (Bytedance) Y et al: "EE2-related: Template-based intra mode derivation using MPMs", 22. JVET Meeting; Apr. 20, 2021-Apr. 28, 2021; Teleconference; (The Joint Video Exploration Team of ISO/IEC JTC1/SC29/WG11 and ITU-T SG.16), No. JVET-V0098; m56510 Apr. 22, 2021 (Apr. 22, 2021), pp. 1-3.

Cao (Qualcomm) K et al: "EE2-related: Fusion for template-based intra mode derivation", 23. JVET Meeting; Jul. 7, 2021-Jul. 16, 2021; Teleconference; (The Joint Video Exploration Team of ISO/IEC JTC1/SC29/WG11 and ITU-T SG.16), No. JVET-W0123; m57240 Jul. 7, 2021 (Jul. 7, 2021), pp. 1-2.

Thiow Keng Tan et al: "Intra Prediction by Averaged Template Matching Predictors", Consumer Communications and Networking Conference, 2007, Jan. 1, 2007 (Jan. 1, 2007).

ITU-T, Telecommunication Standardization Sector of ITU, Series H: Audiovisual and Ultimedia Systems Infrastructure of audiovisual services-Coding of moving video, Advanced video coding for generic audiovisual services, H.264 (Apr. 2017).

ITU-T, Telecommunication Standardization Sector of ITU, Series H: Audiovisual and Ultimedia Systems Infrastructure of audiovisual services-Coding of moving video, High efficiency video coding, H.265 (Dec. 2016).

* cited by examiner

DEVICE AND METHOD FOR CODING VIDEO DATA

CROSS-REFERENCE TO RELATED APPLICATION(S)

The present disclosure claims the benefit of and priority to U.S. Provisional Patent Application Ser. No. 63/216,191, filed on Jun. 29, 2021, entitled "PROPOSED BLENDING INDEX DERIVATION OF DECODER SIDE INTRA PREDICTION MODE DERIVATION," the content of which is hereby incorporated fully by reference into the present disclosure.

FIELD

The present disclosure is generally related to video coding and, more specifically, to techniques for using template predictions in template-based intra mode derivation (TIMD).

BACKGROUND

Template-based intra mode derivation (TIMD) is a coding tool for video coding. In a conventional video coding method, an encoder and a decoder may use the previously reconstructed samples neighboring a target block to generate one of a plurality of intra default modes for predicting the target block.

However, the TIMD prediction for the target block is determined based on only one prediction mode selected by using template predictions, so the coding efficiency may not be high enough when the TIMD is used to predict the target block. Therefore, the encoder and the decoder may need a new TIMD for predicting or reconstructing the target block more precisely.

SUMMARY

The present disclosure is directed to a device and method for predicting a block unit in an image frame by using template predictions in TIMD.

In a first aspect of the present disclosure, a method of decoding a bitstream and an electronic device for performing the method are provided. The method includes receiving the bitstream; determining a block unit from an image frame according to the bitstream; selecting a plurality of intra candidate modes from a plurality of intra default modes for the block unit; generating a template prediction for each of the plurality of intra candidate modes; selecting a plurality of prediction modes from the plurality of intra candidate modes based on the template predictions; and reconstructing the block unit based on the plurality of prediction modes.

An implementation of the first aspect further includes determining a plurality of template blocks neighboring the block unit; determining a plurality of template references neighboring the plurality of template blocks; and predicting the plurality of template blocks based on the plurality of template references by using the plurality of intra candidate modes to generate the template predictions.

An implementation of the first aspect further includes determining a plurality of cost values by comparing the plurality of template blocks with each of the template predictions, respectively, wherein selecting the plurality of prediction modes is further based on the plurality of cost values.

In another implementation of the first aspect, each of the plurality of cost values determined by a cost function corresponds to one of the template predictions.

In another implementation of the first aspect, the plurality of template blocks includes a top neighboring block and a left neighboring block, each neighboring the block unit.

An implementation of the first aspect further includes predicting the block unit based on the plurality of prediction modes to generate a plurality of predicted blocks, each corresponding to one of the plurality of prediction modes; and weightedly combining the plurality of predicted blocks to generate a prediction block with a plurality of weighting parameters, wherein reconstructing the block unit is further based on the prediction block.

In another implementation of the first aspect, the plurality of prediction modes is selected based on a plurality of template blocks; and the plurality of weighting parameters is determined based on the plurality of template blocks.

In another implementation of the first aspect, the plurality of template blocks is predicted to generate the template predictions for selecting the plurality of prediction modes based on the template predictions of the plurality of template blocks; the plurality of weighting parameters is determined based on a plurality of cost values; and the plurality of cost values is determined by comparing the plurality of template blocks with each of the template predictions, respectively.

In another implementation of the first aspect, the plurality of intra candidate modes is a plurality of most probable modes (MPMs) selected from the plurality of intra default modes.

An implementation of the first aspect further includes determining a plurality of template regions neighboring the block unit; filtering the plurality of template regions by using a gradient filter for generating a plurality of template angles and a plurality of template amplitudes, wherein each of the plurality of template angles corresponds to one of the plurality of template amplitudes; and generating a histogram of gradient (HoG) based on the plurality of template angles and the plurality of template amplitudes for selecting the plurality of intra candidate modes.

An implementation of the first aspect further includes mapping each of the plurality of template angles to one of the plurality of intra default modes based on a predefined relationship to generate at least one mapping mode; and generating the HoG by accumulating the plurality of template amplitudes based on the at least one mapping mode, wherein the plurality of intra candidate modes is selected from the plurality of intra default modes based on the accumulated plurality of template amplitudes in the HoG.

In a second aspect of the present disclosure, a method for decoding a bitstream and an electronic device for performing the method are provided. The method includes receiving the bitstream; determining, from an image frame, a block unit and a plurality of neighboring regions neighboring the block unit according to the bitstream; selecting a plurality of intra candidate modes from a plurality of intra default modes based on the neighboring regions; generating a template prediction for each of the plurality of intra candidate modes; selecting a plurality of prediction modes from the plurality of intra candidate modes based on the template predictions; and reconstructing the block unit based on the plurality of prediction modes.

An implementation of the second aspect further includes determining a plurality of template blocks neighboring the block unit; determining a plurality of template references neighboring the plurality of template blocks; and predicting the plurality of template blocks based on the plurality of template references by using the plurality of intra candidate modes to generate the template predictions.

An implementation of the second aspect further includes determining a plurality of cost values by comparing the plurality of template blocks with each of the template predictions, respectively, wherein selecting the plurality of prediction modes is further based on the plurality of cost values.

In another implementation of the second aspect, each of the plurality of cost values determined by a cost function corresponds to one of the template predictions.

In another implementation of the second aspect, the plurality of template blocks includes a top neighboring block and a left neighboring block, each neighboring the block unit.

An implementation of the second aspect further includes predicting the block unit based on the plurality of prediction modes to generate a plurality of predicted blocks, each corresponding to one of the plurality of prediction modes; and weightedly combining the plurality of predicted blocks to generate a prediction block with a plurality of weighting parameters, wherein reconstructing the block unit is further based on the prediction block.

In another implementation of the second aspect, the plurality of prediction modes is selected based on a plurality of template blocks; and the plurality of weighting parameters is determined based on the plurality of template blocks.

In another implementation of the second aspect, the plurality of template blocks is predicted to generate the template predictions for selecting the plurality of prediction modes based on the template predictions of the plurality of template blocks; the plurality of weighting parameters is determined based on a plurality of cost values; and the plurality of cost values is determined by comparing the plurality of template blocks with each of the template predictions, respectively.

In another implementation of the second aspect, the plurality of neighboring regions is a plurality of reconstructed blocks neighboring the block unit; the plurality of reconstructed blocks is reconstructed based on at least one reconstructed mode prior to reconstructing the block unit; and the plurality of intra candidate modes is a plurality of most probable modes (MPMs) selected from the plurality of intra default modes based on the at least one reconstructed mode.

An implementation of the second aspect further includes filtering the plurality of neighboring regions by using a gradient filter to generate a plurality of template angles and a plurality of template amplitudes, wherein each of the plurality of template angles corresponds to one of the plurality of template amplitudes; and generating a histogram of gradient (HoG) based on the plurality of template angles and the plurality of template amplitudes for selecting the plurality of intra candidate modes.

An implementation of the second aspect further includes mapping each of the plurality of template angles to one of the plurality of intra default modes based on a predefined relationship to generate at least one mapping mode; and generating the HoG by accumulating the plurality of template amplitudes based on the at least one mapping mode, wherein the plurality of intra candidate modes is selected from the plurality of intra default modes based on the accumulated plurality of template amplitudes in the HoG.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details such as functional entities, techniques, protocols, and standards are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or using one or more digital signal processors (DSPs). Although some of the disclosed implementations are oriented to software installed and executing on computer hardware, alternative implementations implemented as firmware, or as hardware, or as a combination of hardware and software are well within the scope of the present disclosure. The computer readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

Figure 1:
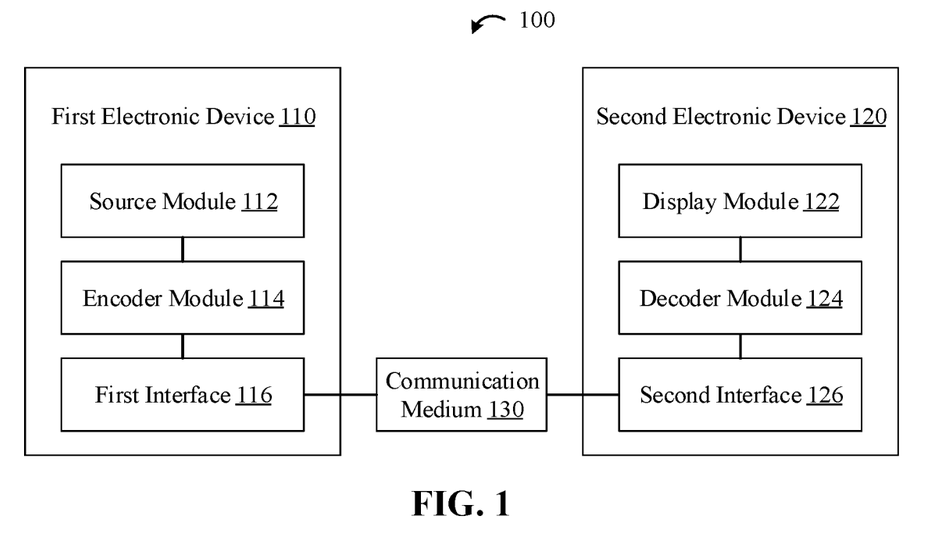
FIG. 1 illustrates a block diagram of a system configured to encode and decode video data according to an implementation of the present disclosure.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
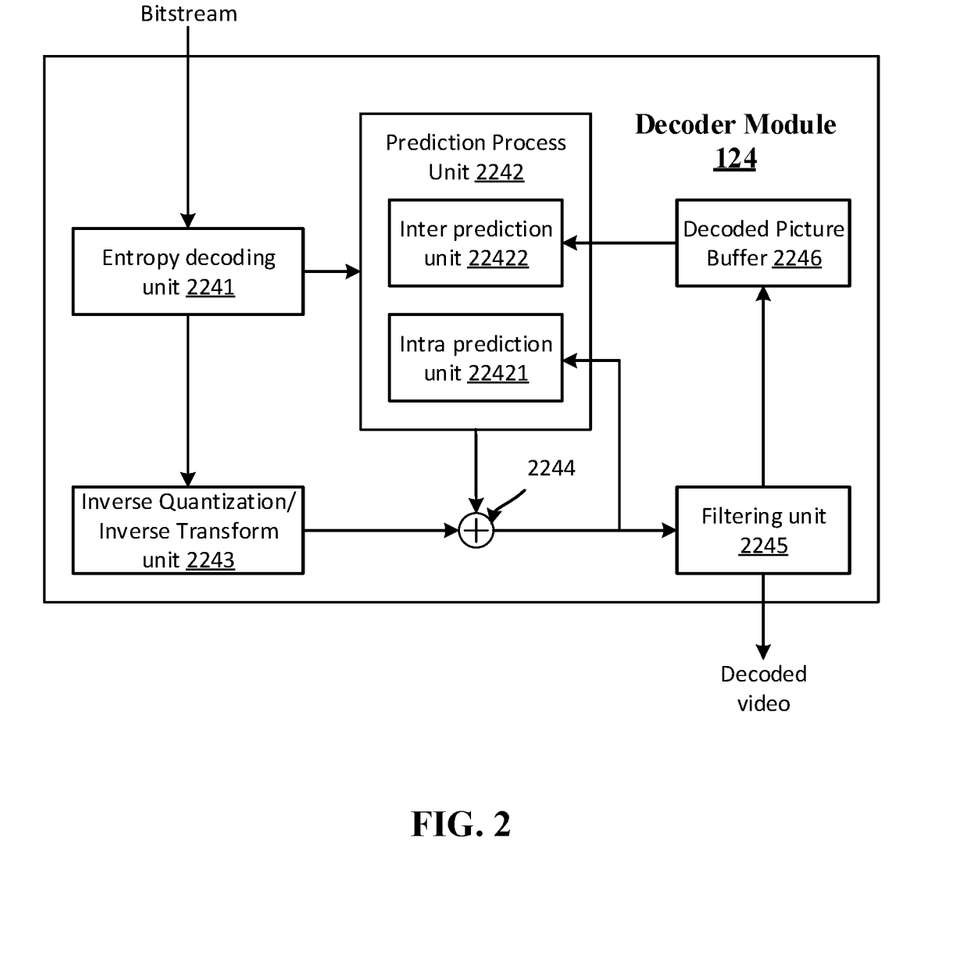
FIG. 2 illustrates a block diagram of the decoder module of the second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loéve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
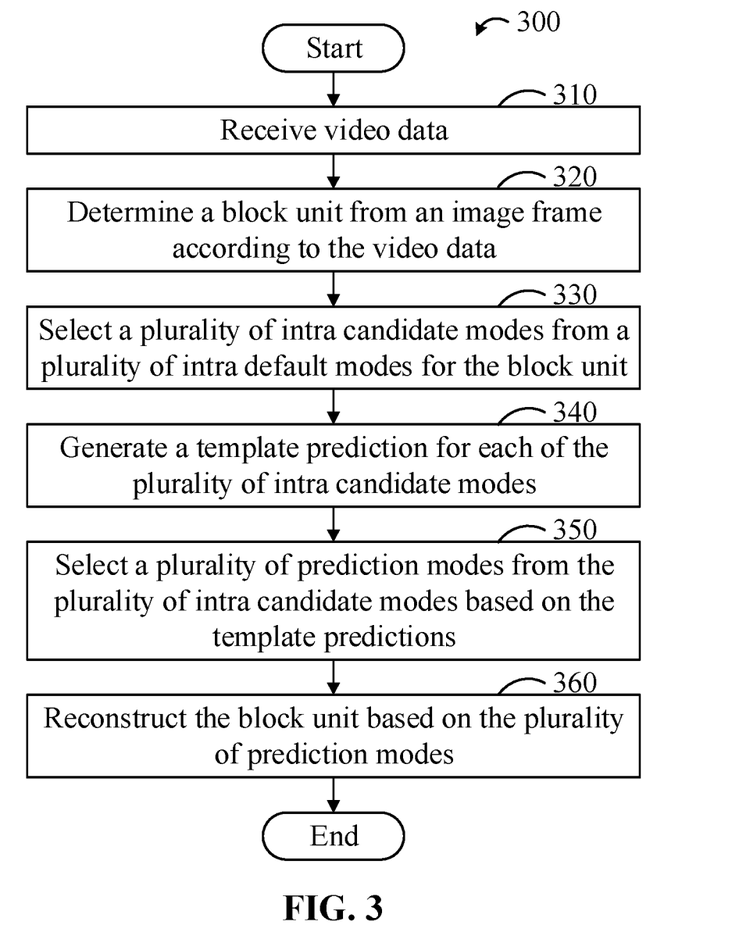
FIG. 3 illustrates a flowchart of a method for decoding video data by an electronic device according to an implementation of the present disclosure.

FIG. 3 illustrates a flowchart of a method 300 for decoding video data by an electronic device according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or fewer blocks may be utilized without departing from the present disclosure.

At block 310, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from an image frame according to the video data.

With reference to FIG. 1 and FIG. 2, the decoder module 124 may determine the image frame based on the bitstream and divide the image frame to determine the block unit according to the partition indications in the bitstream. For example, the decoder module 124 may divide the image frames to generate a plurality of CTUs, and further divide one of the CTUs to determine the block unit according to the partition indications based on any video coding standard.

At block 330, the decoder module 124 selects a plurality of intra candidate modes from a plurality of intra default modes for the block unit.

With reference to FIG. 1 and FIG. 2, the decoder module 124 may determine the intra default modes for predicting the block unit by intra prediction. The intra default modes may include a plurality of non-angular modes and a plurality of angular modes. The non-angular modes may include a Planar mode and a DC mode. In addition, the number of the angular modes may be equal to 32 for the method 300, when the decoder module 124 decodes the block unit in high efficiency video coding (HEVC). The number of the angular modes may be equal to 65 for the method 300, when the decoder module 124 decodes the block unit in versatile video coding (VVC) or VVC test model (VTM). Furthermore, the number of the angular modes may be equal to 129 for the method 300, when the decoder module 124 decodes the block unit in enhanced compression model (ECM). Thus, the number of the intra default modes may be equal to 34 for the method 300 in HEVC, the number of the intra default modes may be equal to 67 for the method 300 in VVC or VTM, and the number of the intra default modes may be equal to 130 for the method 300 in ECM.

Figure 4A:
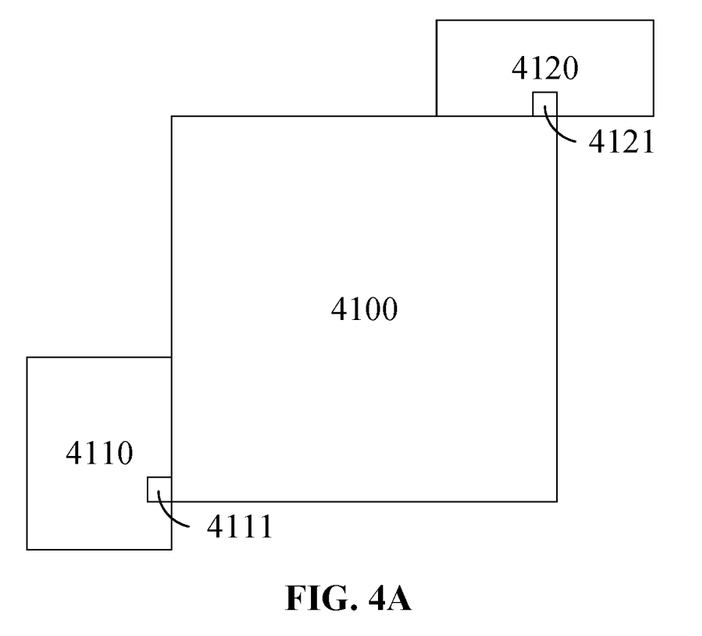
FIG. 4A and FIG. 4B are illustrations of an example implementation of a neighboring region of a block unit according to an implementation of the present disclosure.
Figure 4B:
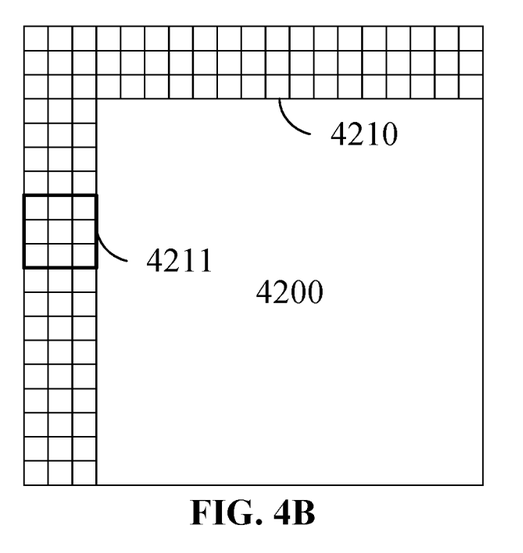

FIG. 4A and FIG. 4B are illustrations of an example implementation of a plurality of neighboring regions of a block unit according to an embodiment of the present disclosure. FIG. 4A is an illustration of an example implementation of a block unit 4100 and a plurality of neighboring regions 4110 and 4120. The neighboring regions 4110 and 4120 may be a plurality of reconstructed blocks neighboring the block unit 4100. The reconstructed blocks may be reconstructed based on at least one reconstructed mode prior to reconstructing the block unit 4100. The neighboring region 4110 and the neighboring region 4120 neighboring the block unit 4100 are two different reconstructed blocks reconstructed prior to reconstructing the block unit 4100. The decoder module 124 selects the neighboring region 4110 and the neighboring region 4120 based on a plurality of neighboring positions 4111 and 4121. The neighboring position 4111 may be located to the left side of a bottom-left corner of the block unit 4100, and the neighboring position 4121 may be located above a top-right corner of the block unit 4100. When a reconstructed block neighboring the block unit 4100 covers the neighboring position 4111, the reconstructed block may be regarded as the neighboring region 4110. When a reconstructed block neighboring the block unit 4100 covers the neighboring position 4121, the reconstructed block may be regarded as the neighboring region 4120. The at least one reconstructed mode of the neighboring regions 4110 and 4120 may be used to determine the intra candidate modes. When the reconstructed mode of the neighboring region 4110 is identical to the reconstructed mode of the neighboring region 4120, the number of the at least one reconstructed mode of the neighboring regions 4110 and 4120 is equal to one. When the reconstructed mode of the neighboring region 4110 is different from the reconstructed mode of the neighboring region 4120, the number of the at least one reconstructed mode of the neighboring regions 4110 and 4120 is equal to two. The intra candidate modes may be a plurality of most probable modes (MPMs) selected from the intra default modes based on the at least one reconstructed mode of the neighboring regions 4110 and 4120. The MPMs may be selected from the intra default modes by using the at least one reconstructed mode according to a selection scheme of any video coding standard, such as VVC, HEVC, and advanced video coding (AVC), or any reference software of the video coding standard, such as VCM and ECM.

FIG. 4B is an illustration of an example implementation of a block unit 4200 and a plurality of neighboring regions 4210 neighboring the block unit 4200. The decoder module 124 determines the neighboring regions 4210 neighboring the block unit 4200. The neighboring regions 4210 may be a plurality of neighboring regions neighboring the block unit 4200. A top neighboring region included in the neighboring regions 4210 may be located above the block unit 4200, and a left neighboring region included in the neighboring regions 4210 may be located to the left side of the block unit 4200. In addition, there may be a top-left neighboring region located to the top-left side of a top left corner of the block unit 4200. The neighboring regions 4210 may include a plurality of reconstructed samples. A height of the top neighboring region may be equal to the number Nrt of the reconstructed samples along a vertical direction, and a width of the top neighboring region may be equal to a width of the block unit 4200. A height of the left neighboring region may be equal to a height of the block unit 4200, and a width of the left neighboring region may be equal to the number Nrl of the reconstructed samples along a horizontal direction. In addition, a height of the top-left neighboring region may be equal to the number Nrt of the reconstructed samples along the vertical direction, and a width of the top-left neighboring region may be equal to the number Nrl of the reconstructed samples along the horizontal direction. In one implementation, the numbers Nrt and Nrl may be positive integers. In addition, the numbers Nrt and Nrl may be equal to each other. Furthermore, the numbers Nrt and Nrl may be greater than or equal to three.

All of the reconstructed samples in the neighboring regions 4210 may be set to be included in a plurality of template regions. The template regions are filtered to generate a plurality of template gradients by using a gradient filter. In other words, the neighboring regions may be filtered. In one implementation, the gradient filter may be a Soble filter. The template gradients are generated by filtering the reconstructed samples in the neighboring regions 4210 based on the following filtering equation:

$$G_x = \begin{bmatrix} -1 & 0 & +1 \\ -2 & 0 & +2 \\ -1 & 0 & +1 \end{bmatrix} * A \text{ or } G_x = \begin{bmatrix} +1 & 0 & -1 \\ +2 & 0 & -2 \\ +1 & 0 & -1 \end{bmatrix} * A$$

-continued $$G_y = \begin{bmatrix} -1 & -2 & -1 \\ 0 & 0 & 0 \\ +1 & +2 & +1 \end{bmatrix} * A \text{ or } G_y = \begin{bmatrix} +1 & +2 & +1 \\ 0 & 0 & 0 \\ -1 & -2 & -1 \end{bmatrix} * A$$

wherein the operator * represents a 2-dimensional signal processing convolution operation, and the matrix A represents one of a plurality of filtered blocks 4211 in the neighboring regions 4210. In other words, each of the template gradients is generated based on one of the filtered blocks 4211. Each of the filtered blocks 4211 includes Nf reconstructed samples. The number Nf may be a positive integer. For example, the number Nf is equal to nine when a size of the filtered blocks 4211 is 3×3.

The template gradients of the filtered blocks 4211 may be further computed to generate a plurality of template amplitudes and a plurality of template angles. Thus, the template regions may be filtered by using the gradient filter for generating the template angles and the template amplitudes. Each of the template amplitudes may be generated by deriving an absolute value of a sum of a corresponding one of the template gradients. In addition, each of the template angles may be derived based on a divided result of two fractional gradients Gx and Gy. The template amplitudes and the template angles may be derived by the following equation:

$$Amp = \text{abs}(G_x) + \text{abs}(G_y)$$

$$\text{Angle} = \arctan\left(\frac{G_y}{G_x}\right)$$

A predefined relationship between the template angles and the intra default modes may be predefined in the first electronic device 110 and the second electronic device 120. For example, the relationship may be stored in form of a look-up table (LUT), an equation, or a combination there of. Thus, when the template angles are determined, the decoder module 124 may generate at least one mapping mode by mapping each of the plurality of template angles to one of the plurality of intra default modes based on the predefined relationship. In other words, the at least one mapping mode may be generated by mapping each of the plurality of template angles to the plurality of intra default modes. For example, when each of the template angles of the block unit 4200 corresponds to the same intra default mode, the number of the at least one mapping mode may be equal to one. In addition, when some of the template angles of the block unit 4200 correspond to different intra default modes, the number of the at least one mapping mode may be greater than one. In one implementation, 360 degrees may be divided into multiple sections, and each section may represent an intra prediction index. Thus, if a template angle falls into one section, the intra prediction index corresponding to the section may be derived according to a mapping rules.

The template gradient of a specific one of the filtered blocks 4211 may be computed to generate a specific one of the template amplitudes and a specific one of the template angles. Thus, the specific template amplitude may correspond to the specific template angle. In other words, each of the template angles of the filtered blocks 4211 may correspond to a corresponding one of the template amplitudes. Thus, when the at least one mapping mode is determined, the decoder module 124 may generate a histogram of gradient (HoG) by accumulating the template amplitudes based on the at least one mapping mode. For example, when two template angles different from each other correspond to the same one of the intra default modes, two template amplitudes of the two template angles may be accumulated for one mapping mode corresponding to the two template angles. Thus, the HoG may be generated by accumulating the template amplitudes based on the at least one mapping mode. A horizontal axis of the HoG may represent intra prediction mode indices, and a vertical axis of the HoG may represent accumulated strengths (e.g., amplitudes). In the implementation, the HoG is generated based on the template angles and the template amplitudes for selecting the plurality of intra candidate modes.

Some of the intra default modes may be selected to be the intra candidate modes based on the accumulated amplitudes in the HoG. When the number of the intra candidate modes is equal to six, six intra prediction indices may be selected based on the top six amplitudes. When the number of the intra candidate modes is equal to three, three intra prediction indices may be selected based on the top three amplitudes. Thus, when the number of the intra candidate modes is equal to X, X intra prediction indices may be selected based on the top X amplitudes. The number X may be a positive integer. In one implementation, a non-angular mode in the intra default modes may be directly added into the intra candidate modes. For example, the non-angular mode may be the Planar mode. In another implementation, the non-angular mode may be the DC mode.

Continuing with FIG. 3, at block 340, the decoder module 124 generates a template prediction for each of the plurality of intra candidate modes.

Figure 5A:
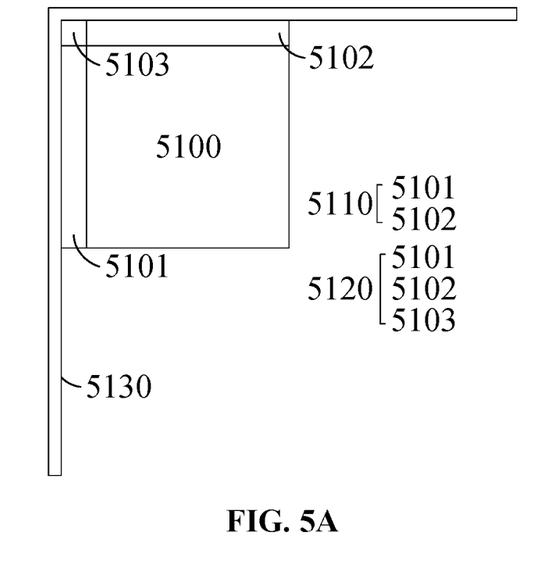
FIG. 5A and FIG. 5B are illustrations of an example implementation of a block unit, a plurality of template blocks, and a reference region according to an implementation of the present disclosure.
Figure 5B:
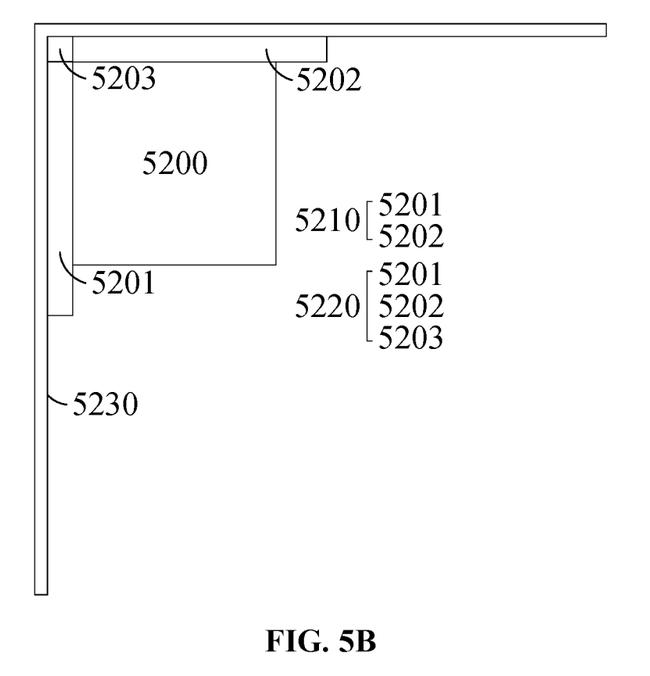

With reference to FIG. 1 and FIG. 2, the decoder module 124 may determine a plurality of template blocks neighboring the block unit. FIG. 5A and FIG. 5B are illustrations of an example implementation of a block unit, a plurality of template blocks, and a reference region according to an embodiment of the present disclosure. FIG. 5A is an illustration of an example implementation of a block unit 5100, a plurality of template blocks 5101-5103 neighboring the block unit 5100, and a reference region 5130 neighboring the template blocks 5101-5103. In the implementation, with reference to FIG. 4B and FIG. 5A, the neighboring regions 4210 may be identical to the plurality of template blocks 5101-5103. A first one of the template blocks 5101 may be a left neighboring block located to the left side of the block unit 5100, a second one of the template blocks 5102 may be a top neighboring block located above the block unit 5100, and a third one of the template blocks 5103 may be a top-left neighboring block located to the top-left side of the block unit 5100. A height of the top neighboring block may be equal to the number Nbt of the reconstructed samples of the top neighboring block along a vertical direction, and a width of the top neighboring block may be equal to a width of the block unit 4200. A height of the left neighboring block may be equal to a height of the block unit 4200, and a width of the left neighboring block may be equal to the number Nbl of the reconstructed samples of the left neighboring block along a horizontal direction. In addition, a height of the top-left neighboring block may be equal to the number Nbt of the reconstructed samples of the top neighboring block along the vertical direction, and a width of the top-left neighboring block may be equal to the number Nbl of the reconstructed samples of the left neighboring block along the horizontal direction. In one implementation, the numbers Nbt and Nbl may be positive integers. In addition, the numbers Nbt and Nbl may be equal to or different from each other. Furthermore, the numbers Nbt and Nbl may be greater than or equal to two. For example, the number Nbt may be equal to two, three, or four, and the number Nbt may be equal to two, three, or four.

In some implementations, the decoder module 124 may determine the template blocks 5101-5102 as a template unit 5110 to generate the template predictions. In another implementation, the decoder module 124 may determine the template blocks 5101-5103 as a template unit 5120 to generate the template predictions. The decoder module 124 determines a plurality of template references in the reference region 5130 and neighboring the plurality of template blocks 5101-5103. The template references may be a plurality of reference samples reconstructed prior to reconstructing the block unit 5100. Furthermore, the template unit may include a plurality of template samples reconstructed prior to reconstructing the block unit 5100.

The block unit 5100 may have a block width W0 and a block height H0. The first template block 5101 may have a first template width W1 and a first template height H0, the second template block 5102 may have a second template width W0 and a second template height H2, and the third template block 5103 may have a third template width W1 and a third template height H2. The reference region 5130 may have a reference width M and a reference height N. Furthermore, the reference width M may be equal to $2\times(W0+W1)+1$, and the reference height N may be equal to $2\times(H0+H2)+1$. In the implementation, the numbers W0, H0, W1, H2, M, and N may be positive integers. In one implementation, the number W1 may be equal to the number H2. In another implementation, the number W1 may be different from the number H2.

FIG. 5B is an illustration of an example implementation of a block unit 5200, a plurality of template blocks 5201-5203 neighboring the block unit 5200, and a reference region 5230 neighboring the template blocks 5201-5203. A first one of the template blocks 5201 may be a left neighboring block located to the left side of the block unit 5200, a second one of the template blocks 5202 may be a top neighboring block located above the block unit 5200, and a third one of the template blocks 5203 may be a top-left neighboring block located to the top-left side of the block unit 5200. In some implementations, the decoder module 124 may determine the template blocks 5201-5202 as a template unit 5210 to generate the template predictions. In another implementation, the decoder module 124 may determine the template blocks 5201-5203 as a template unit 5220 to generate the template predictions. The decoder module 124 determines a plurality of template references in the reference region 5230 and neighboring the plurality of template blocks 5201-5203. The template references may be a plurality of reference samples reconstructed prior to reconstructing the block unit 5200. Furthermore, the template unit may include a plurality of template samples reconstructed prior to reconstructing the block unit 5200.

The block unit 5200 may have a block width W0 and a block height H0. The first template block 5201 may have a first template width W1 and a first template height H1 greater than the block height H0, the second template block 5202 may have a second template width W2 greater than the block width W0 and a second template height H2, and the third template block 5203 may have a third template width W1 and a third template height H2. The reference region 5230 may have a reference width M and a reference height N. Furthermore, the reference width M may be equal to $2\times(W1+W2)+1$, and the reference height N may be equal to $2\times(H1+H2)+1$. In the implementation, the numbers W0, H0, W1, H1, W2, H2, M, and N may be positive integers. In one implementation, the number W1 may be equal to the number H2. In another implementation, the number W1 may be different from the number H2.

The decoder module 124 may predict the template blocks in the template unit based on the reference region having the template references by using the intra candidate modes to generate the template predictions. The decoder module 124 may predict the template blocks in the template unit based on the template references by using one of the intra candidate modes to generate one of the template predictions. Thus, the number of the intra candidate modes may be equal to the number of the template predictions. For example, when the number of the intra candidate modes is equal to six, the number of the template predictions may also be equal to six.

Continuing with FIG. 3, at block 350, the decoder module 124 selects a plurality of prediction modes from the plurality of intra candidate modes based on the template predictions.

The prediction modes are selected based on the template blocks. With reference to FIG. 1 and FIG. 2, the decoder module 124 may compare the template predictions with the template samples in the template unit. Since the template samples in the template unit are reconstructed prior to reconstructing the block unit, the template samples are also reconstructed prior to generating the template predictions. Thus, when the template predictions are generated, the decoder module 124 may compare the template predictions with the reconstructed template sample in the template unit.

The decoder module 124 may compare the template predictions of the template blocks with the template unit by using a cost function to select the prediction modes from the intra candidate modes. Thus, the template blocks are predicted to generate the template predictions for selecting the prediction modes based on the template predictions of the template blocks. The decoder module 124 may determine a plurality of cost values by comparing the reconstructed template blocks with the template predictions. For examples, the decoder module 124 may compare the reconstructed template blocks with one of the template predictions generated by using one of the intra candidate modes to generate one of the cost values. Thus, each of the cost values determined by the cost function corresponds to one of the template predictions generated by using one of the intra candidate modes.

The cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select the prediction modes from the intra candidate modes based on the cost values of the template predictions generated based on the template blocks. When the number of the prediction modes is equal to two, two intra prediction indices may be selected based on the two lowest cost values. When the number of the intra candidate modes is equal to three, three intra prediction indices may be selected based on the three lowest cost values. Thus, when the number of the prediction modes is equal to Y, Y intra prediction indices may be selected based on the Y lowest cost values. The number Y may be a positive integer.

When the prediction modes are selected, the decoder module 124 may determine a plurality of weighting parameters based on the cost values of the template predictions generated based on the template blocks. Thus, the weighting parameters are determined based on the template blocks.

The template blocks may be predicted to generate the template predictions for selecting the prediction modes based on the template predictions of the template blocks. The weighting parameters may be determined based on the cost values, and the cost values is determined by comparing the template blocks with each of the template predictions, respectively.

The decoder module 124 may compare the cost values of the prediction modes to determine the weighting parameters. For example, when the number of the prediction modes is equal to two, the weighting parameters of the two prediction modes may be determined based on the following functions:

$$w_1 = \frac{C_2}{C_1 + C_2}, w_2 = \frac{C_1}{C_1 + C_2}$$

wherein the numbers $w_1$ and $w_2$ are the weighting parameters, and $C_1$ and $C_2$ are the cost values, of the prediction modes.

The decoder module 124 may predict the block unit based on a reference line of the block unit by using the prediction modes and the weighting parameters. The decoder module 124 may predict the block unit based on the prediction modes to generate a plurality of predicted blocks. Each of the predicted blocks corresponds to one of the prediction modes, so each of the predicted blocks also corresponds to one of the weighting parameters. The decoder module 124 may weightedly combine the predicted blocks to generate a prediction block of the block unit by the predicted blocks and the weighting parameters.

With reference to FIG. 1 and FIG. 2, the decoder module 124 may directly weightedly combine the template predictions by a plurality of weighting parameters. The weighting parameters may be determined based on the HoG. For example, the weighting parameters may be determined based on the accumulated amplitudes of the template blocks in the HoG. Thus, the plurality of weighting parameters is determined based on the plurality of template blocks. For example, when the number of the combined template predictions is equal to three, the weighting parameters of the three intra candidate modes may be determined based on the following functions:

$$w_1 = \frac{A_1}{A_1 + A_2 + A_3}, w_2 = \frac{A_2}{A_1 + A_2 + A_3}, w_3 = \frac{A_3}{A_1 + A_2 + A_3}$$

wherein the numbers $w_1$, $w_2$, and $w_3$ are the weighting parameters, and $A_1$, $A_2$ and $A_3$ are the accumulated amplitudes, of the intra candidate modes selected based on the template blocks. In the implementation, the weighting parameter $w_i$ may be equal to $$\frac{A_i}{(A_1 + A_2 + \ldots + A_p)},$$

and the number p may be equal to the number of the combined template predictions.

When the number of the intra candidate modes is equal to three, the decoder module 124 may generate a plurality of intermediate predictions of the block unit based on the three intra candidate modes. There may be three intermediate predictions each generated by using two of the intra candidate modes. In addition, one intermediate prediction may be generated by using the three intra candidate modes. When the number of the intra candidate modes is equal to Y, the number NI of intermediate predictions may be less than or equal to $C_2^Y + C_3^Y + \ldots + C_Y^Y$. For example, when the number Y is equal to 2, the number NI is equal to 1. When the number Y is equal to 3, the number NI may be less than or equal to 4. Furthermore, when the number Y is equal to 4, the number NI may be less than or equal to 11. For example, the number NI may be equal to 3, when the number of Y is equal to 3 and the decoder module 124 selects two of the intra candidate modes for generating each of the intermediate predictions. In one implementation, the function $C_m^Y$ represents the number of m-combinations for Y elements, the number NI is a positive integer greater than or equal to 1, and the number m is a positive integer greater than or equal to 2.

When an intermediate prediction is generated by using m of the Y intra candidate modes, the weighting parameters may be determined based on the accumulated amplitudes of the m intra candidate modes. For example, the number Y is equal to 4 and the number m is equal to 2. Then, the two weighting parameters may be determined only based on the two accumulated amplitudes of the two intra candidate modes for generating one of the intermediate predictions. For example, the two weighting parameters may be equal to $A_1/(A_1+A_2)$ and $A_2/(A_1+A_2)$.

The decoder module 124 may compare the intermediate predictions with the template unit by using a cost function to select a prediction block from the intermediate predictions. The decoder module 124 may determine a plurality of cost values by comparing the reconstructed template blocks with the intermediate predictions. For example, the decoder module 124 may compare the reconstructed template blocks with one of the intermediate predictions to generate one of the cost values. Thus, each of the cost values determined by the cost function corresponds to one of the intermediate predictions generated by using at least two of the intra candidate modes.

The cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select the prediction block from the intermediate predictions according to the cost values of the intermediate predictions generated based on the template blocks. The decoder module 124 may select a specific one of the intermediate predictions having the lowest cost value as the prediction block. Thus, the intra candidate modes used to generate the specific intermediate prediction may be regarded as the prediction modes.

Returning to FIG. 3, at block 360, the decoder module 124 reconstructs the block unit based on the plurality of prediction modes.

With further reference to FIG. 1 and FIG. 2, the decoder module 124 may determine a plurality of residual components from the bitstream for the block unit and add the residual components into the prediction block to reconstruct the block unit. The decoder module 124 may reconstruct all of the other block units in the image frame for reconstructing the image frame and the video.

Figure 6:
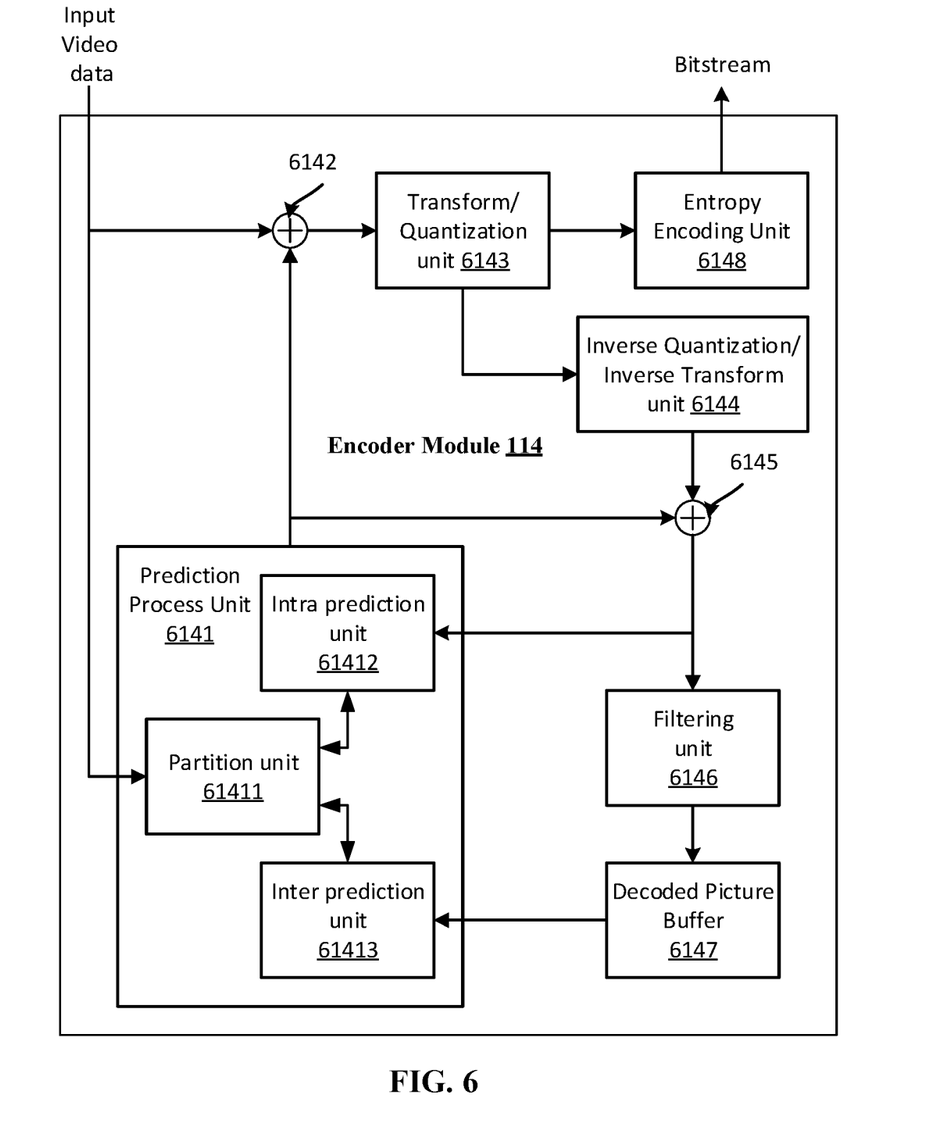
FIG. 6 illustrates a block diagram of the encoder module of the first electronic device illustrated in FIG. 1 according to an implementation of the present disclosure.

FIG. 6 illustrates a block diagram of the encoder module 114 of the first electronic device 110 illustrated in FIG. 1 according to an implementation of the present disclosure. The encoder module 114 may include a prediction processor (e.g., prediction process unit 6141), at least a first summer (e.g., first summer 6142) and a second summer (e.g., second summer 6145), a transform/quantization processor (e.g., transform/quantization unit 6143), an inverse quantization/inverse transform processor (e.g., inverse quantization/inverse transform unit 6144), a filter (e.g., filtering unit 6146), a decoded picture buffer (e.g., decoded picture buffer 6147), and an entropy encoder (e.g., entropy encoding unit 6148). The prediction process unit 6141 of the encoder module 114 may further include a partition processor (e.g., partition unit 61411), an intra prediction processor (e.g., intra prediction unit 61412), and an inter prediction processor (e.g., inter prediction unit 61413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

The prediction process unit 6141 may select one of the coding results generated by the intra prediction unit 61412 and the inter prediction unit 61413 based on a mode selection method, such as a cost function. The mode selection method may be a rate-distortion optimization (RDO) process.

The prediction process unit 6141 may determine the selected coding result and provide a predicted block corresponding to the selected coding result to the first summer 6142 for generating a residual block and to the second summer 6145 for reconstructing the encoded block unit. The prediction process unit 6141 may further provide syntax elements, such as motion vectors, intra mode indicators, partition information, and other syntax information, to the entropy encoding unit 6148.

The intra prediction unit 61412 may intra predict the current block unit. The intra prediction unit 61412 may determine an intra prediction mode directed toward a reconstructed sample neighboring the current block unit in order to encode the current block unit.

The intra prediction unit 61412 may encode the current block unit using various intra prediction modes. The intra prediction unit 61412 of the prediction process unit 6141 may select an appropriate intra prediction mode from the selected modes. The intra prediction unit 61412 may encode the current block unit using a cross component prediction mode to predict one of the two chroma components of the current block unit based on the luma components of the current block unit. The intra prediction unit 61412 may predict a first one of the two chroma components of the current block unit based on the second of the two chroma components of the current block unit.

The inter prediction unit 61413 may inter predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

The first summer 6142 may generate the residual block by subtracting the prediction block determined by the prediction process unit 6141 from the original current block unit. The first summer 6142 may represent the component or components that perform this subtraction.

The transform/quantization unit 6143 may apply a transform to the residual block in order to generate a residual transform coefficient and then quantize the residual transform coefficients to further reduce bit rate. The transform may be one of a DCT, DST, AMT, MDNS ST, HyGT, signal dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 6143 may perform a scan of the matrix including the quantized transform coefficients. Alternatively, the entropy encoding unit 6148 may perform the scan.

The entropy encoding unit 6148 may receive a plurality of syntax elements from the prediction process unit 6141 and the transform/quantization unit 6143, including a quantization parameter, transform data, motion vectors, intra modes, partition information, and other syntax information. The entropy encoding unit 6148 may encode the syntax elements into the bitstream.

The entropy encoding unit 6148 may entropy encode the quantized transform coefficients by performing CAVLC, CABAC, SBAC, PIPE coding, or another entropy coding technique to generate an encoded bitstream. The encoded bitstream may be transmitted to another device (i.e., the second electronic device 120 in FIG. 1) or archived for later transmission or retrieval.

The inverse quantization/inverse transform unit 6144 may apply inverse quantization and inverse transformation to reconstruct the residual block in the pixel domain for later use as a reference block. The second summer 6145 may add the reconstructed residual block to the prediction block provided from the prediction process unit 6141 in order to produce a reconstructed block for storage in the decoded picture buffer 6147.

The filtering unit 6146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 6145.

The decoded picture buffer 6147 may be a reference picture memory that stores the reference block for use by the encoder module 614 to encode video, such as in intra or inter coding modes. The decoded picture buffer 6147 may include a variety of memory devices, such as DRAM (e.g., including SDRAM), MRAM, RRAM, or other types of memory devices. The decoded picture buffer 6147 may be on-chip with other components of the encoder module 114 or off-chip relative to those components.

The encoder module 114 may receive video data and use a plurality of intra default modes to predict a plurality of image frames in the video data by using the method 300. The video data may be a video to be encoded. The encoder module 114 may determine a block unit from one of the image frames according to the video data.

The encoder module 114 may select a plurality of intra candidate modes from the intra default modes for the block unit. The intra candidate modes may be a plurality of most probable modes (MPMs) determined based on at least one reconstructed mode of a plurality of neighboring regions for the block unit. The intra candidate modes may be selected based on a histogram of gradient (HoG) generated by a plurality of template angles and a plurality of template amplitudes derived according to a plurality of neighboring regions.

The encoder module 114 may generate a template prediction for each of the intra candidate modes. A template unit neighboring the block unit may be predicted based on a reference region by using each of the intra candidate modes. The number of the template predictions may be equal to the number of the intra candidate modes.

The encoder module 114 may select a plurality of prediction modes from the intra candidate modes based on the template predictions. The template predictions may be compared with a plurality of reconstructed samples in the template unit by a cost function for selecting the prediction modes. In another implementation, the template predictions may be directly weightedly combined to generate a plurality of combined template predictions. The combined template predictions may be compared with the reconstructed samples in the template unit by the cost function for selecting the prediction modes.

The encoder module 114 may determine the prediction block based on the prediction modes and compare a plurality of pixel elements in the block unit with the prediction block to determine a plurality of residual values. The encoder module 114 may encode the residual values into a bitstream for transmitting to the second electronic device 120. Furthermore, in order to further encode the other blocks in the image frame and the other image frames, the encoder module 114 may further reconstruct the block unit based on the prediction block and the residual values. Thus, the encoder module 114 may also use the intra default modes to predict the image frames in the video data by using the method 300.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding a bitstream by an electronic device, the method comprising:
   receiving the bitstream;
   determining a block unit from an image frame according to the bitstream;
   generating a histogram of gradient (HoG) for selecting a plurality of intra candidate modes from a plurality of intra default modes for the block unit;
   generating a template prediction for each of the plurality of intra candidate modes that is selected from the HoG based on an accumulated plurality of template amplitudes included in the HoG;
   selecting, based on the generated template predictions, a plurality of prediction modes from the plurality of intra candidate modes, which is selected from the HoG based on the accumulated plurality of template amplitudes included in the HoG; and
   reconstructing the block unit based on the plurality of prediction modes.

2. The method according to claim 1, further comprising:
   determining a plurality of template blocks neighboring the block unit;
   determining a plurality of template references neighboring the plurality of template blocks; and
   predicting the plurality of template blocks based on the plurality of template references by using the plurality of intra candidate modes to generate the template predictions.

3. The method according to claim 2, further comprising:
   determining a plurality of cost values by comparing each of the plurality of template blocks with each of the template predictions, respectively, wherein
   selecting the plurality of prediction modes is further based on the plurality of cost values.

4. The method according to claim 3, wherein:
   each of the plurality of cost values determined by a cost function corresponds to one of the template predictions.

5. The method according to claim 2, wherein:
   the plurality of template blocks includes a top neighboring block and a left neighboring block, each neighboring the block unit.

6. The method according to claim 1, further comprising:
   predicting the block unit based on the plurality of prediction modes to generate a plurality of predicted blocks, each corresponding to one of the plurality of prediction modes; and
   weightedly combining the plurality of predicted blocks to generate a prediction block with a plurality of weighting parameters, wherein
   reconstructing the block unit is further based on the prediction block.

7. The method according to claim 6, wherein:
   the plurality of prediction modes is selected based on a plurality of template blocks, and
   the plurality of weighting parameters is determined based on the plurality of template blocks.

8. The method according to claim 7, wherein:
   the plurality of template blocks is predicted to generate the template predictions for selecting the plurality of prediction modes based on the template predictions of the plurality of template blocks,
   the plurality of weighting parameters is determined based on a plurality of cost values, and
   the plurality of cost values is determined by comparing each of the plurality of template blocks with each of the template predictions, respectively.

9. The method according to claim 1, wherein:
the plurality of intra candidate modes is a plurality of most probable modes (MPMs) selected from the plurality of intra default modes.

10. The method according to claim 1, further comprising:
determining a plurality of template regions neighboring the block unit; and
filtering the plurality of template regions by using a gradient filter for generating a plurality of template angles and a plurality of template amplitudes, wherein:
each of the plurality of template angles corresponds to one of the plurality of template amplitudes, and
generating the HoG is further based on the plurality of template angles and the plurality of template amplitudes.

11. The method according to claim 10, further comprising:
mapping each of the plurality of template angles to one of the plurality of intra default modes based on a predefined relationship to generate at least one mapping mode,
wherein the HoG is generated further by accumulating the plurality of template amplitudes based on the at least one mapping mode to determine the accumulated plurality of template amplitudes in the HoG.

12. An electronic device for decoding a bitstream, the electronic device comprising:
one or more processors; and
one or more non-transitory computer-readable media coupled to the one or more processors and storing one or more computer-executable instructions that, when executed by at least one of the one or more processors, cause the electronic device to:
receive the bitstream;
determine a block unit from an image frame according to the bitstream;
generate a histogram of gradient (HoG) for selecting a plurality of intra candidate modes from a plurality of intra default modes for the block unit;
generate a template prediction for each of the plurality of intra candidate modes that is selected from the HoG based on an accumulated plurality of template amplitudes included in the HoG;
select, based on the generated template predictions, a plurality of prediction modes from the plurality of intra candidate modes, which is selected from the HoG based on the accumulated plurality of template amplitudes included in the HoG; and
reconstruct the block unit based on the plurality of prediction modes.

13. The electronic device according to claim 12, wherein the one or more computer-executable instructions, when executed by the at least one of the one or more processors, further cause the electronic device to:
determine a plurality of template blocks neighboring the block unit;
determine a plurality of template references neighboring the plurality of template blocks; and
predict the plurality of template blocks based on the plurality of template references by using the plurality of intra candidate modes to generate the template predictions.

14. The electronic device according to claim 13, wherein the one or more computer-executable instructions, when executed by the at least one of the one or more processors, further cause the electronic device to:
determine a plurality of cost values by comparing each of the plurality of template blocks with each of the template predictions, respectively, wherein
selecting the plurality of prediction modes is further based on the plurality of cost values.

15. The electronic device according to claim 12, wherein the one or more computer-executable instructions, when executed by the at least one of the one or more processors, further cause the electronic device to:
predict the block unit based on the plurality of prediction modes to generate a plurality of predicted blocks, each corresponding to one of the plurality of prediction modes; and
weightedly combine the plurality of predicted blocks to generate a prediction block with a plurality of weighting parameters, wherein
reconstructing the block unit is further based on the prediction block.

16. The electronic device according to claim 15, wherein:
the plurality of prediction modes is selected based on a plurality of template blocks, and
the plurality of weighting parameters is determined based on the plurality of template blocks.

17. The electronic device according to claim 16, wherein:
the plurality of template blocks is predicted to generate the template predictions for selecting the plurality of prediction modes based on the template predictions of the plurality of template blocks,
the plurality of weighting parameters is determined based on a plurality of cost values, and
the plurality of cost values is determined by comparing each of the plurality of template blocks with each of the template predictions, respectively.

18. The electronic device according to claim 12, wherein:
the plurality of intra candidate modes is a plurality of most probable modes (MPMs) selected from the plurality of intra default modes.

19. The electronic device according to claim 12, wherein the one or more computer-executable instructions, when executed by the at least one of the one or more processors, further cause the electronic device to:
determine a plurality of template regions neighboring the block unit; and
filter the plurality of template regions by using a gradient filter for generating a plurality of template angles and a plurality of template amplitudes, wherein:
each of the plurality of template angles corresponds to one of the plurality of template amplitudes, and
generating the HoG is further based on the plurality of template angles and the plurality of template amplitudes.

20. The electronic device according to claim 19, wherein the one or more computer-executable instructions, when executed by the at least one of the one or more processors, further cause the electronic device to:
map each of the plurality of template angles to one of the plurality of intra default modes based on a predefined relationship to generate at least one mapping mode,
wherein the HoG is generated further by accumulating the plurality of template amplitudes based on the at least one mapping mode to determine the accumulated plurality of template amplitudes in the HoG.

* * * * *